(12) United States Patent
Wu et al.

(10) Patent No.: US 11,087,717 B2
(45) Date of Patent: Aug. 10, 2021

(54) RECEIVING CIRCUIT AND SIGNAL PROCESSING METHOD FOR HIGH DEFINITION MULTIMEDIA INTERFACE

(71) Applicant: Realtek Semiconductor Corp., HsinChu (TW)

(72) Inventors: Tsung-Hsuan Wu, Hsinchu County (TW); Hsu-Jung Tung, Hsinchu County (TW); Ching-Sheng Cheng, Nantou County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/808,403

(22) Filed: Mar. 4, 2020

(65) Prior Publication Data

US 2020/0312276 A1 Oct. 1, 2020

(30) Foreign Application Priority Data

Mar. 26, 2019 (TW) ................................ 108110365

(51) Int. Cl.
*G09G 5/12* (2006.01)
*G09G 5/00* (2006.01)

(52) U.S. Cl.
CPC .............. *G09G 5/12* (2013.01); *G09G 5/006* (2013.01); *G09G 2320/0252* (2013.01); *G09G 2330/021* (2013.01); *G09G 2360/18* (2013.01); *G09G 2370/12* (2013.01)

(58) Field of Classification Search
CPC .. G09G 5/12; G09G 5/006; G09G 2320/0252; G09G 2330/021; G09G 2360/18; G09G 2370/12

USPC ....................................................... 345/204
See application file for complete search history.

(56) References Cited

U.S. PATENT DOCUMENTS

| 2005/0228995 | A1 | 10/2005 | Kwak |
| 2009/0296938 | A1 | 12/2009 | Devanand |
| 2011/0134330 | A1 | 6/2011 | Yu |
| 2012/0027203 | A1* | 2/2012 | Inada ................ G09G 5/006 380/42 |
| 2012/0054517 | A1* | 3/2012 | Fuh .................. H04N 21/4436 713/320 |

(Continued)

FOREIGN PATENT DOCUMENTS

| CN | 102385567 B | 6/2014 |
| WO | 2011/084340 A1 | 7/2011 |

OTHER PUBLICATIONS

Huang, the specification, including the claims, and drawings in the U.S. Appl. No. 16/805,815, filed Mar. 1, 2020.

*Primary Examiner* — Mark Edwards
(74) *Attorney, Agent, or Firm* — Winston Hsu

(57) ABSTRACT

The present invention provides a receiving circuit applied to an HDMI, wherein the receiving circuit includes a decoder, a frame key calculating circuit, a line key calculating circuit and a control circuit. In the operations of the receiving circuit, the decoder decodes a data stream to generate at least one image frame, the frame key calculating circuit is arranged to calculate a frame key according to the image frame, the line key calculating circuit is arranged to calculate a plurality of line keys according to the image frame, and the control circuit determines to turn off or turn on the line key calculating circuit according to whether or not the image frame is displayed on a display panel.

10 Claims, 5 Drawing Sheets

(56) References Cited

U.S. PATENT DOCUMENTS

2012/0140924 A1* 6/2012 Murakami ....... H04N 21/43635
380/200

* cited by examiner

RECEIVING CIRCUIT AND SIGNAL PROCESSING METHOD FOR HIGH DEFINITION MULTIMEDIA INTERFACE

BACKGROUND OF THE INVENTION

1. Field of the Invention

The present invention relates to a High Definition Multimedia Interface (HDMI), and more particularly, to a receiving circuit that conforms the HDMI and a High-Bandwidth Digital Content Protection (HDCP) specification.

2. Description of the Prior Art

In the HDMI and HDCP specifications, when the display device is connected to multiple signal sources by using the HDMI connector and the user switches from one signal source to another signal source, it may take several seconds to display the images of the other signal source, causing inconvenience to the user. Therefore, in order to make the display device quickly display the images when the user switches the signal source, each HDMI port needs to be continuously connected to the corresponding signal source and maintain HDCP authentication. However, maintaining HDCP authentication will greatly increase the power consumption.

SUMMARY OF THE INVENTION

It is therefore an objective of the present invention to provide a receiving circuit applied to HDMI and associated signal processing method, which can greatly reduce the power consumption of the display device while maintaining the HDCP authentication to avoid the display waiting time, to solve the above-mentioned problems.

In one embodiment of the present invention, a receiving circuit applied to an HDMI is disclosed, wherein the receiving circuit includes a decoder, a frame key calculating circuit, a line key calculating circuit and a control circuit. In the operations of the receiving circuit, the decoder decodes a data stream to generate at least one image frame, the frame key calculating circuit is arranged to calculate a frame key according to the image frame, the line key calculating circuit is arranged to calculate a plurality of line keys according to the image frame, and the control circuit determines to turn off or turn on the line key calculating circuit according to whether or not the image frame is displayed on a display panel.

In another embodiment of the present invention, a signal processing method applied to an HDMI is disclosed, wherein the signal processing method includes the steps of: decoding a data stream to generate at least one image frame; calculating a frame key according to the image frame; and determining if referring to the image frame to calculate a plurality of line keys according to whether or not the image frame is displayed on a display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
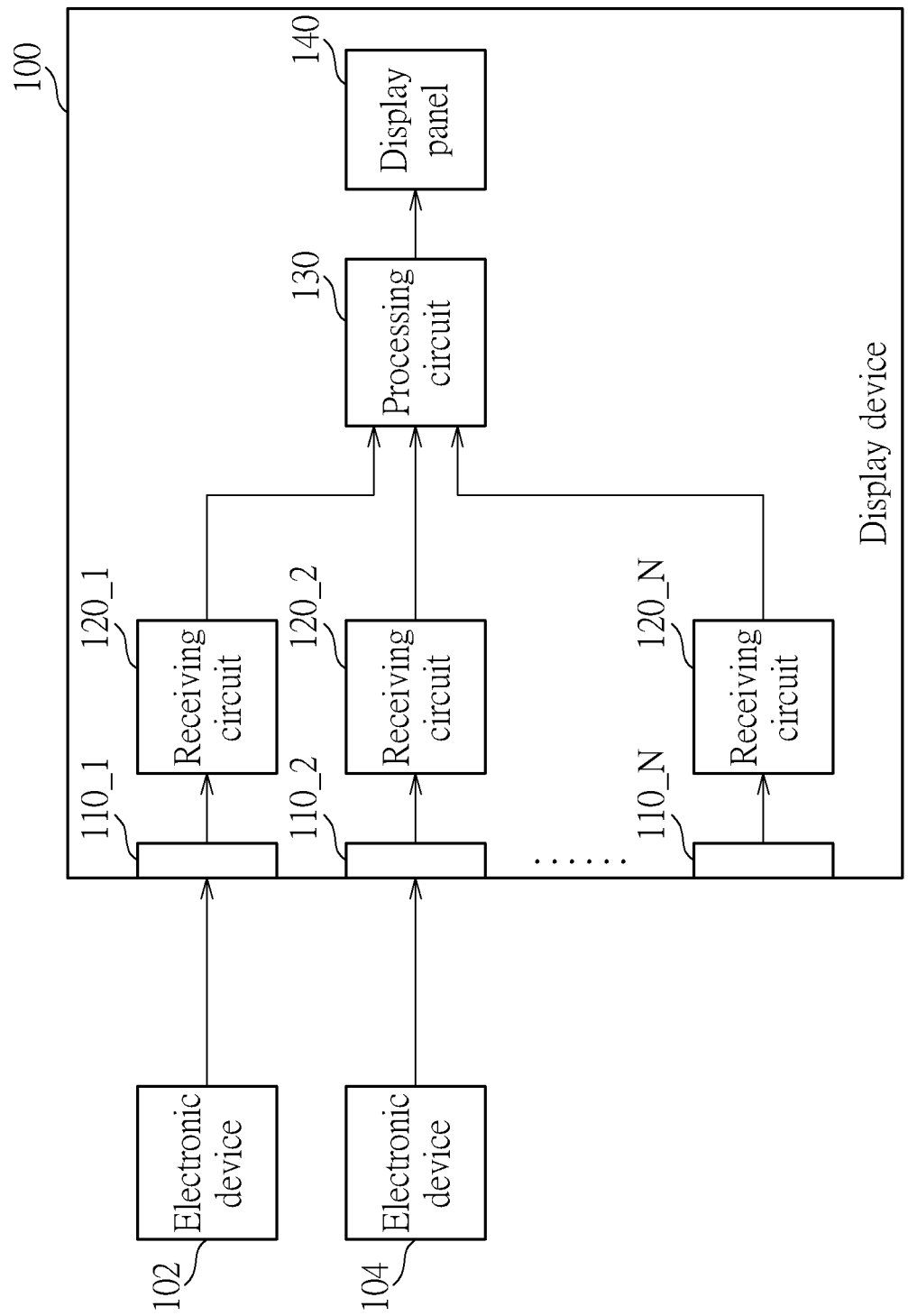
FIG. 1 is a diagram illustrating a display device according to one embodiment of the present invention.

FIG. 1 is a diagram illustrating a display device 100 according to one embodiment of the present invention. As shown in FIG. 1, the display device 100 includes a plurality of HDMI connectors 110_1-110_N, a plurality of receiving circuits 120_1-120_N, a processing circuit 130 and a display panel 140. In this embodiment, the HDMI connectors 110_1-110_N of the display device 100 are used to connect to a plurality of signal sources such as electronic devices 102 and 104, and the display device 100 receives image data from the electronic devices 102 and 104 to be displayed thereon. In this embodiment, the image data received by the display device 100 complies with the HDCP specification, that is, the key authentication is required for displaying the image data.

In the embodiment shown in FIG. 1, the display device 100 can simultaneously connect to a plurality of signal sources such as the electronic devices 102 and 104, and the user can control the display device 100 to select and display the image data of one of the electronic device. For example, when the user selects the image data of the electronic device 102, the receiving circuit 120_1 receives the image data of the electronic device 102 via the HDMI connector 110_1, and after the decoding operation and the key authentication, the image data is transmitted to the processing circuit 130 for subsequent processing and then displayed on the display panel 140. In addition, in order to make the display device 100 quickly display the image data from the electronic device 104 when the user switches the signal source, the receiving circuit 120_2 continuously receives the image data from the electronic device 104 and performs the decoding operation and the key authentication, even if the image data of the electronic device 104 is not currently displayed on the display panel 140.

As described above, since the display device 100 performs the decoding operation and the key authentication for all of the received image signals, the receiving circuits 120_1-120_N have large power consumption. Therefore, the present embodiment provides a method for reducing the power consumption of the key authentication in the receiving circuits 120_1-120_N.

Figure 2:
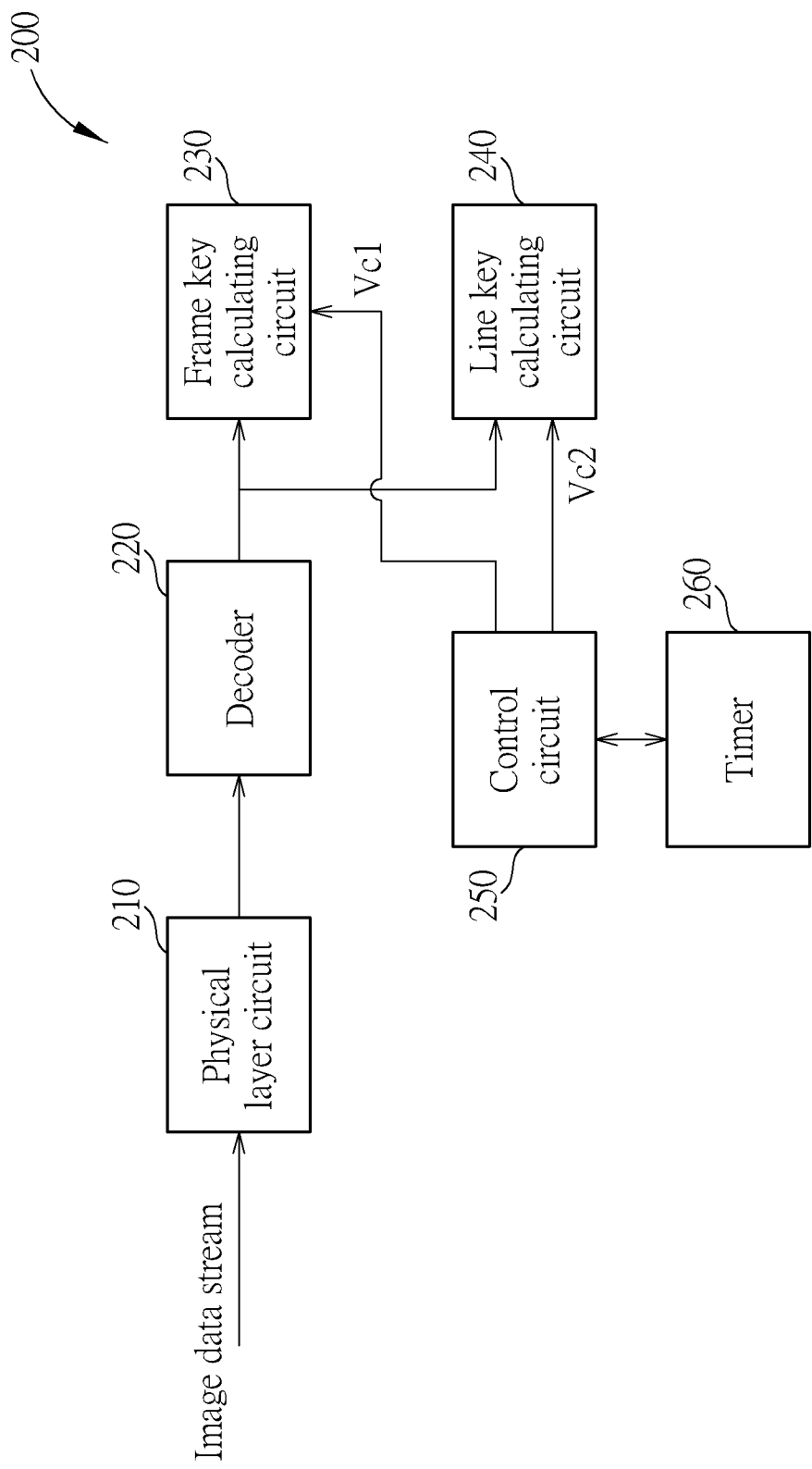
FIG. 2 is a diagram illustrating a receiving circuit according to one embodiment of the present invention.

FIG. 2 is a receiving circuit 200 according to one embodiment of the present invention, where the receiving circuit 200 may be any one of the receiving circuits 120_1-120_N shown in FIG. 1. In FIG. 2, the receiving circuit 200 includes a physical layer circuit 210, a decoder 220, a frame key calculating circuit 230, a line key calculating circuit 240, a control circuit 250 and a timer 260.

In the present embodiment, the receiving circuit 200 has different operations according to whether or not the received image data is displayed on the display panel 140. Specifically, when image data received by the receiving circuit 200 will be displayed on the display panel 140, the physical layer circuit 210 receives an image data stream via one of the HDMI connectors 110_1-110_N to generate a corresponding clock signal. The decoder 220 receives the image data stream and the clock signal from the physical layer circuit 210, and decodes the image data stream to generate a plurality of image frames. The frame key calculating circuit 230 is configured to calculate a frame key according to each image frame, and the line key calculating circuit is configured to calculate a plurality of line keys according to each image frame for the key authentication. After the key authentication succeeds, the processing circuit 130 can process the image frames generated by the receiving circuit 200, and the display panel 140 displays the processed image frames. In this embodiment, the control circuit 250 generates control signals Vc1 and Vc2 to continuously enable the frame key calculating circuit 230 and the line key calculating circuit 240, and the frame key calculating circuit 230 calculates the frame key according to a portion of contents of a vertical synchronization signal of the corresponding image frame, and the frame key of each image frame is related to the frame key calculation of the next image frame. The line key calculating circuit 240 calculates the plurality of line keys based on at least the active display data in each image frame, wherein the line keys are only related to the key authentication of the current frame, that is, the line keys does not relate to the frame key calculation and line key calculation for the next image frame. It should be noted that since the calculation of the frame key and the line key and the authentication method can refer to the HDCP specification, and the present invention does not focus on the calculation of the frame key and the line key and the authentication method, so the details are not described here.

In addition, when the image data received by the receiving circuit will not be displayed on the display panel 140, the physical layer circuit 210 receives an image data stream via one of the HDMI connectors 110_1-110_N to generate a corresponding clock signal. Then, the decoder 220 receives the image data stream and the clock signal from the physical layer circuit 210, and decodes the image data stream to generate a plurality of image frames. At this time, because the image frame generated by the decoder 220 does not need to be displayed on the display panel 140, the control circuit 250 can directly disable the line key calculating circuit 240 to avoid unnecessary power consumption. In addition, in order to quickly display the image frames when the user switches the signal source, the control circuit 250 can periodically control the frame key calculating circuit 230 to operate in a normal mode and a sleep mode, so that the frame key calculating circuit 230 can calculate the frame key of each image frame for the calculation of the frame key for the next image frame.

Figure 3:
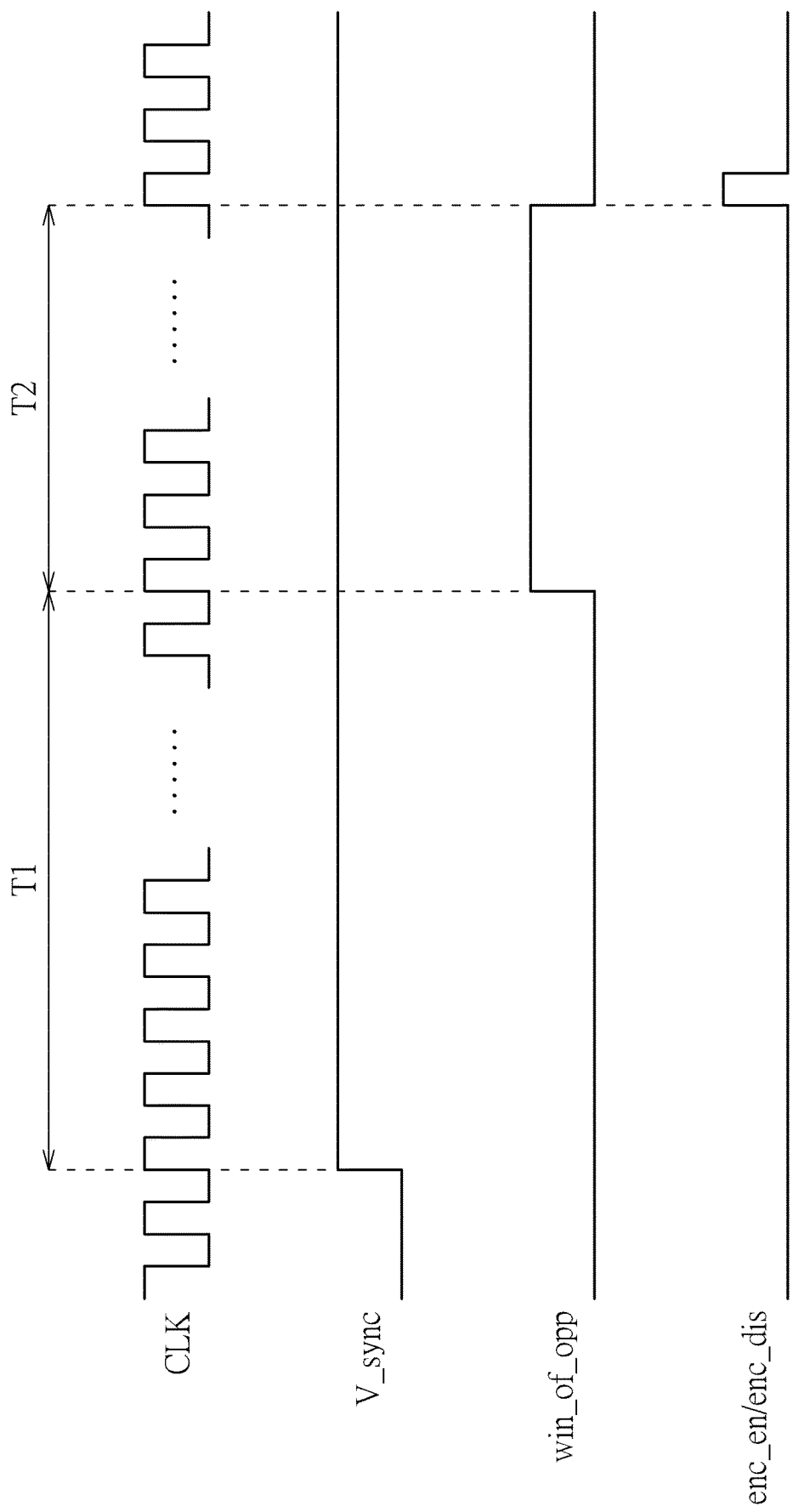
FIG. 3 is a timing diagram of a clock signal, a vertical synchronization signal and an encryption status signal.
Figure 4:
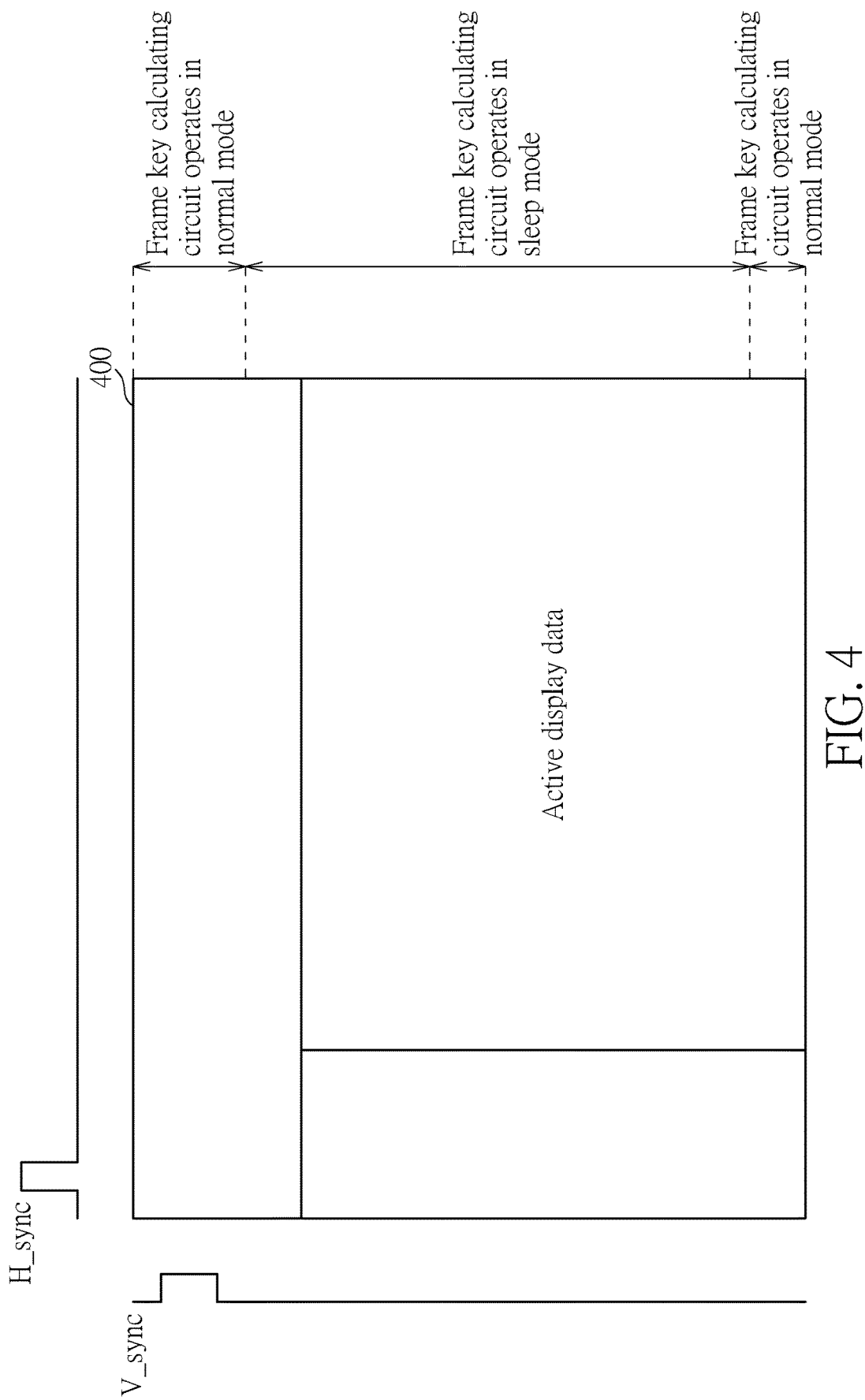
FIG. 4 is a diagram illustrating a frame key calculating circuit operates in a normal mode and a sleep mode.

In detail, referring to FIG. 3 and FIG. 4 together, FIG. 3 is a timing diagram of a clock signal CLK, a vertical synchronization signal V_sync, a signal win_of_opp and an encryption status signal enc_en/enc_dis, and FIG. 4 is a diagram illustrating that the frame key calculating circuit 230 operates in the normal mode and the sleep mode. When the decoder 220 decodes the image data stream and starts to generate the image frame 400, the frame key calculating circuit 230 operates in the normal mode; and when the decoder 220 or the frame key calculating circuit 230 detects a period of time T1 after the vertical synchronization signal V_sync is enabled and the signal win_of_opp is enabled, the frame key calculating circuit 230 starts to determine the encryption status signal enc_en/enc_dis according to the data within the period T2. In one embodiment, the encryption status signal enc_en/enc_dis can be determined according to a plurality of control bits of the signal from the electronic device 102/104 during the period T2. The encryption status signal enc_en/enc_dis is used to indicate if using the received data within the period T1 and the frame key of a previous image frame to calculate the frame key of the image frame 400. In detail, if the encryption status signal enc_en is determined according to the data within the period T2, the frame key calculating circuit 230 can calculate a new frame key; and if the encryption status signal enc_dis is determined according to the data within the period T2, the frame key calculating circuit 230 uses the frame key of the previous image frame to serve as the frame key of the image frame 400. In one embodiment, the encryption status signal enc_en/enc_dis is determined within the period T2. In one embodiment, the period T1 can be $0$-$511^{th}$ cycles of the clock signal CLK after the vertical synchronization signal V_sync is enabled, the period T2 can be $512^{th}$-$527^{th}$ cycles of the clock signal CLK, and the frame key calculating circuit 230 can calculate the frame key within a period of time (e.g. (48+56) cycles of the clock signal CLK) after determining the encryption status signal enc_en/enc_dis. Regarding the calculation of the frame key, in the HDCP 1.4 specification, the frame key calculating circuit 230 refers to the received data within the period T1 and the frame key of the previous image frame to calculate the frame key of the image frame 400; and in the HDCP 2.2 specification, the frame key calculating circuit 230 only needs to record counting values of the image frames. Then, if the frame key is required to be calculated, after the frame key is calculated, the frame key can be stored in a register within the frame key calculating circuit 230, and the control circuit 250 controls the frame key calculating circuit 230 to enter the sleep mode to save power consumption, but at this time the internal register still has power to store the frame key.

At this time, the control circuit 250 continuously determines the time point at which the frame key calculating circuit 230 is enabled according to the time information provided by the timer 260. The control circuit 250 can enable the frame key calculating circuit 230 before the vertical synchronization signal V_sync of the next image frame appears according to the time information provided by the timer 260, for example, the control circuit 250 can enable the frame key calculating circuit 230 when the decoder 220 outputs the last few rows of the active display data of the image frame 400, for preparing the frame key calculation of the next image frame. In addition, the image frame shown in FIG. 4 and related horizontal synchronization signal H_sync and vertical synchronization signal V_sync. In FIG. 4, the active display data of the image frame 400 is the content actually displayed on the display panel 140, and the remaining areas are the vertical blanking interval and the horizontal blanking interval, wherein the frame key calculating circuit 230 enters the normal mode at the last few rows of the active display data, in preparation for the calculation of the frame key after the vertical synchronization signal V_sync is enabled, and the frame key calculating circuit 230 enters the sleep mode when the frame key calculation is completed (generally before the active display data). Because the contents of the image frame 400 are well known to those skilled in the art, the details are not described here. Moreover, in order to save power consumption, after the frame key is calculated by frame key calculating circuit 230, the control circuit 250 further controls at least one of the physical layer circuit 210 and the decoder 220 to enter the sleep mode. Likewise, the control circuit 250 controls the physical layer circuit 210 or decoder 220 to enter the normal mode before the time point when the vertical synchronization signal appears according to the time information provided by the timer 260.

In one embodiment, when the data stream received by the receiving circuit 200 is not displayed on the display panel 140, the line key calculating circuit 240 is completely disabled without storing any line key, for example, the registers inside the line key calculating circuit 240 stops working and does not store any previously calculated line key. In addition, when the frame key calculating circuit 230 operates in the sleep mode, only part of the circuit is disabled (for example, the circuit related to the clock signal processing is disabled), and the register still stores the calculated frame key for the calculation of the next image frame.

As described above, by enabling or disabling the line key calculating circuit 240 according to whether or not the image frame 400 is displayed on the display panel 140, and the frame key calculating circuit 230 is periodically controlled to enter the sleep mode or the normal mode, the display device 100 can effectively reduce the power consumption while maintaining the connection between the display device 100 and the electronic devices 102, 104.

Figure 5:
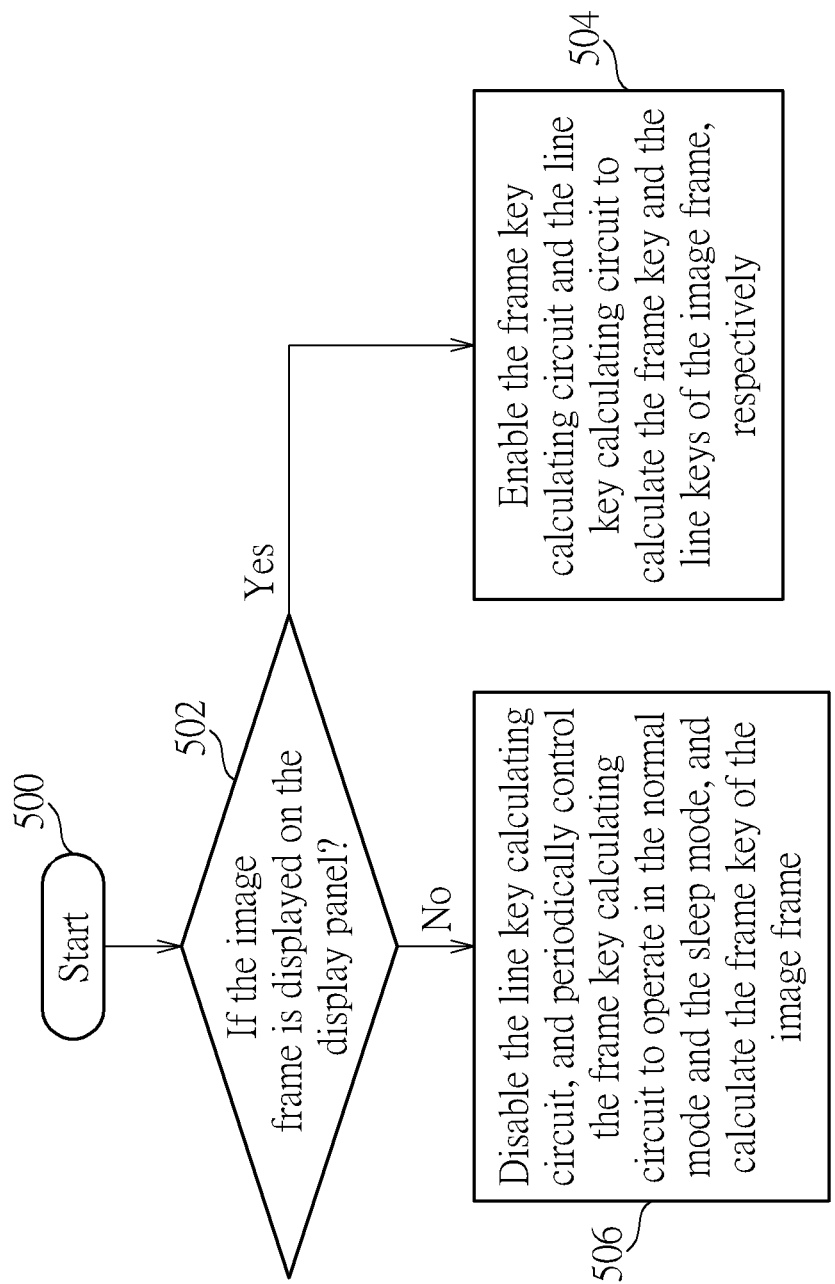
FIG. 5 is a flowchart of a signal processing method applied to HDMI according to one embodiment of the present invention.

FIG. 5 is a flowchart of a signal processing method applied to HDMI according to one embodiment of the present invention. Referring to the above embodiments, the flow is described as follows.

Step 500: the flow starts.

Step 502: determine if the image frame is displayed on the display panel, and if yes, the flow enters Step 504; and if not, the flow enters Step 506.

Step 504: enable the frame key calculating circuit and the line key calculating circuit to calculate the frame key and the line keys of the image frame, respectively.

Step 506: disable the line key calculating circuit, and periodically control the frame key calculating circuit to operate in the normal mode and the sleep mode, and calculate the frame key of the image frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiving circuit applied to a High Definition Multimedia Interface (HDMI), comprising:
    a decoder, for decoding a data stream to generate at least one image frame;
    a frame key calculating circuit, coupled to the decoder, for calculating a frame key according to the image frame;
    a line key calculating circuit, coupled to the decoder, for calculating a plurality of line keys according to the image frame;
    a control circuit, for determining to enable or disable the line key calculating circuit according to whether or not the image frame is displayed on a display panel; and
    a timer;
    wherein the frame key calculating circuit calculates the frame key of the image frame according to data of the image frame within a period of time after a vertical synchronization signal is enabled and before a next vertical synchronization signal is enabled, and the frame key of the image frame is used for a calculation of a frame key of a next image frame following the image frame;
    wherein the control circuit further controls the frame key calculating circuit to alternately operate in a sleep mode and a normal mode within each image frame; and the control circuit refers to time information provided by the timer to determine a time point of the vertical synchronization signal; and for each image frame, the control circuit controls the frame key calculating circuit to operate in the sleep mode or the normal mode according to the time point of the vertical synchronization signal, wherein the control circuit controls the frame key calculating circuit to operate in the normal mode before the next vertical synchronization signal appears according to the time information provided by the timer.

2. The receiving circuit of claim 1, wherein the line key calculating circuit calculates the plurality of line keys according to active display data of the image frame, wherein the plurality of line keys are irrelevant to calculations of the frame key and line keys of the next image frame.

3. The receiving circuit of claim 1, wherein when the image frame is not displayed on the display panel, the control circuit disables the line key calculating circuit; and when the image frame is displayed on the display panel, the control circuit enables the line key calculating circuit to calculate the plurality of line keys.

4. The receiving circuit of claim 1, wherein the control circuit controls the frame key calculating circuit to enter the normal mode before the time point when the vertical synchronization signal appears according to the time information provided by the timer, and the control circuit controls the frame key calculating circuit to enter the sleep mode after a period of time that the vertical synchronization signal appears.

5. The receiving circuit of claim 1, wherein when the control circuit controls the frame key calculating circuit to enter the sleep mode, an internal register of frame key calculating circuit still operates to store a previously calculated frame key.

6. The receiving circuit of claim 5, wherein when the control circuit disables the line key calculating circuit, the line key calculating circuit stops working and not store any previously calculated line key.

7. The receiving circuit of claim 1, further comprising:
    a physical layer circuit, coupled to the decoder, for receiving the data stream;
    wherein the control circuit further selectively controls at least one of the physical layer circuit and the decoder to operate in a sleep mode or a normal mode.

8. A signal processing method applied to High Definition Multimedia Interface (HDMI), comprising:
    decoding a data stream to generate at least one image frame;
    using a frame key calculating circuit to calculate a frame key according to the image frame;
    determining if referring to the image frame to calculate a plurality of line keys according to whether or not the image frame is displayed on a display panel;
    controlling the frame key calculating circuit to alternately operate in a sleep mode and a normal mode within each frame;
    referring to time information provided by a timer to determine a time point of a vertical synchronization signal; and
    for each image frame, controlling the frame key calculating circuit to operate in the sleep mode or the normal mode according to the time point of the vertical synchronization signal, wherein the frame key calculating circuit is controlled to operate in the normal mode before the next vertical synchronization signal appears according to the time information provided by the timer;

wherein the step of calculating the frame key according to the image frame comprises:
calculating the frame key of the image frame according to data of the image frame within a period of time after a vertical synchronization signal is enabled and before a next vertical synchronization signal is enabled, and the frame key of the image frame is used for a calculation of a frame key of a next image frame following the image frame.

9. The signal processing method of claim 8, further comprising:
if it is determined to calculate the plurality of line keys, calculating the plurality of line keys according to active display data of the image frame, wherein the plurality of line keys are irrelevant to calculations of the frame key and line keys of the next image frame.

10. The signal processing method of claim 8, wherein the step of determining if referring to the image frame to calculate the plurality of line keys according to whether or not the image frame is displayed on the display panel comprises:
when the image frame is not displayed on the display panel, not calculating the plurality of line keys of the image frame; and
when the image frame is displayed on the display panel, calculating the plurality of line keys according to the image frame.

\* \* \* \* \*